US005400608A

United States Patent [19]
Steed et al.

[11] Patent Number: 5,400,608
[45] Date of Patent: Mar. 28, 1995

[54] HUMIDITY CONTROL SYSTEM

[75] Inventors: Robert L. Steed; Frank R. Ferris, Jr., both of Bellevue, Wash.

[73] Assignee: Ryan Instruments, L.P., Redmond, Wash.

[21] Appl. No.: 14,448

[22] Filed: Feb. 5, 1993

[51] Int. Cl.[6] ............ F25B 41/04

[52] U.S. Cl. ............ 62/91; 62/171; 62/176.4; 236/44 B; 236/44 C

[58] Field of Search ............ 62/176.4, 171, 91, 288, 62/289, 291; 236/44 A, 44 R, 44 B, 44 C

[56] References Cited

U.S. PATENT DOCUMENTS

| | | | |
|---|---|---|---|
| 3,412,571 | 11/1968 | Bolynn | 62/188 |
| 4,340,112 | 7/1982 | Sutoh et al. | 165/16 |
| 4,562,958 | 1/1986 | Busch | 239/7 |
| 4,671,456 | 6/1987 | Groff et al. | 62/171 X |
| 4,730,462 | 3/1988 | Rogers | 62/171 |
| 4,750,545 | 6/1988 | Hile et al. | 62/176.4 X |
| 4,793,144 | 12/1988 | Bidon et al. | 62/171 |
| 4,969,335 | 11/1990 | Sasaki et al. | 62/91 X |

FOREIGN PATENT DOCUMENTS

WO90/08925 8/1990 WIPO .

OTHER PUBLICATIONS

Maintenance Manual, CF-11 M19.1 & 19.2, Prepared for Sea-Land, Thermo King Corp., Minneapolis, Minn., 1991.

Parts Manuel, CF-11 M19.1 & 19.2, Prepared for Sea--Land, Thermo King Corp., Minneapolis, Minn., 1991.

*Primary Examiner*—Harry B. Tanner

*Attorney, Agent, or Firm*—Seed & Berry

[57] ABSTRACT

A humidity control system is provided for controlling the humidity of the air confined within a container. The humidity control system includes sensors for determining the temperature of the air both within and outside the container. The sensors are also constructed to determine the humidity of the air inside the container. A controlled droplet applicator that is responsive to a humidity control signal is provided for increasing the humidity of the air within the container. A data processor is responsive to the sensors for providing the humidity control signal to increase and decrease the humidity of the air within the container. The humidity control system also includes a water flow control system for controlling the flow of water within the container. The water flow control system is responsive to the data processor for substantially preventing water from freezing in the controlled droplet applicator. In a preferred embodiment of the invention, the water flow control system further includes a drain pan for recycling water provided to the air by the controlled droplet applicator.

33 Claims, 2 Drawing Sheets

HUMIDITY CONTROL SYSTEM

TECHNICAL FIELD

The present invention is directed toward systems for controlling the humidity of a substantially confined-space and, more particularly, toward such a system including a water flow control subsystem for controlling the flow of water within the confined space to substantially prevent water from freezing in the humidity control system.

BACKGROUND OF THE INVENTION

Containers for transporting produce over long distances are wellknown. These containers are typically provided with atmospheric control systems to control the temperature and humidity of the air confined within the container. Prior art systems for controlling the humidity of the air confined within a container suffer from several disadvantages as will be discussed below.

A primary disadvantage of prior art humidity control systems is the inability to prevent damage to the system resulting from water freezing. In prior art systems, little or no provision is made to prevent water from freezing within the system. Such freezing usually causes damage to substantially rigid joints and other structures that may be effected by the slight expansion of water upon freezing. As a result, portions of these systems that come in contact with water typically suffer damage, sometimes to the point of inoperability, when the water freezes.

Further, these prior art systems have provided no provision for recycling water that has been absorbed in the air confined within the container. As is known, atmospheric control systems typically include refrigerating coils for refrigerating the air confined within the container. Water that has been absorbed in the air condenses and freezes on the refrigerating coils. To aid in maintaining the efficiency of the refrigerating coils, prior art systems have provided devices for periodically defrosting the refrigerating coils :o release water condensed thereon. Prior art humidity control systems have ignored this condensed water, permitting it to escape to the floor of the container.

The failure of prior art systems to recycle water provided to the air within the container results in a need for prior art systems to provide large reservoirs for containing water used to increase the humidity of the air. These large reservoirs are not only bulky, but are required to contain an extremely large quantity of water.

Accordingly, it is desirable to provide a humidity control system including a water flow control subsystem constructed to prevent freezing water from damaging the humidity control system. It is further desirable to provide a water control subsystem that is constructed for recycling water provided to the air confined within the container. As usual, it is desirable to provide such a water control subsystem that operates efficiently and can be provided in a cost effective manner.

SUMMARY OF THE INVENTION

To solve the foregoing problems of the prior art, the present invention provides a humidity control system for controlling the humidity of air contained in a substantially confined space, e.g., a produce container. The humidity control system includes sensors for sensing temperature and humidity. In various embodiments of the invention, the sensors are adapted to sense the temperature within the confined space in addition to sensing the temperature outside of the confined space.

The invention includes a controlled droplet applicator for increasing and decreasing the humidity of the air contained in the confined space. In a presently preferred embodiment of the invention, the controlled droplet applicator is constructed for converting water into water droplets sized small enough to be absorbed into the air in the confined space. However, as will become apparent to those skilled in the art after reading the detailed description that follows, other apparatus can be substituted for the presently preferred controlled droplet applicator.

The invention also includes a data processor responsive to the sensors for controlling the operation of the humidity control system. One of the functions performed by the data processor is to control the operation of the controlled droplet applicator to thereby control the amount of water that is provided to the air.

The invention further includes a water flow control system for controlling the flow of water within the confined space. The water flow control system is responsive to the data processor for substantially preventing water from freezing in the controlled droplet applicator. In various embodiments of the invention, the water flow control system includes a reservoir and heater, both being responsive to the data processor, for heating water contained in the reservoir thereby to prevent water from freezing in the controlled droplet applicator or the conduit coupling the controlled droplet applicator to the reservoir. In another embodiment of the invention, the water flow control system includes apparatus for removing water from the controlled droplet applicator and the conduit coupling the controlled droplet applicator to the reservoir after the temperature outside of the confined space has reached a predetermined minimum value, to thereby further assist in preventing water from freezing in the controlled droplet applicator. In still another embodiment of the invention, the water flow control system includes a device for recycling water provided to the air in the confined space thereby to further reduce damage to the system caused by water freezing in the water flow control system and to improve the efficiency of the humidity control system.

BRIEF DESCRIPTION OF THE DRAWINGS

FIG. 1 is an illustration of a truck having a container that includes the humidity control system that is the subject of the present invention;

FIG. 2 is a partial schematic illustration of the container taken along lines 2—2 of FIG. 1; and FIG. 3 is a schematic diagram of the humidity control system that is the subject of the present invention.

DETAILED DESCRIPTION OF THE INVENTION

The present invention is a humidity control system for use with a container typically provided for transportation of produce such as fruit and vegetables. With reference to FIG. 1, a truck 100 is illustrated having mounted thereon a container 102. As is known in the art, the container 102 may be readily removable from the truck 100 so that the container 102 may be transported long distances by various vehicles. As an example, the container 102 may initially travel by train to a shipping dock, from there by ship to another shipping dock where it is loaded from the ship to a truck to be transported to its final destination.

It will be apparent to those skilled in the art that although the humidity system that is the subject of the present invention is described herein by reference to a container 102, that the present invention may be used in any application wherein the humidity of a quantity of air that is contained within a relatively confined space is to be controlled. As examples, the present invention may be used in combination with detachable containers such as those described above or in combination with containers that are fixed to railroad cars, trucks, etc. The present invention may also be applied to produce warehouses or other containers that are relatively fixed in position and constructed to confine a quantity of air.

During such a journey, it is important to maintain the temperature and humidity of the air within the container 102 within acceptable limits, thereby to ensure the freshness of the produce that is being transported within the container 102. Accordingly, systems for controlling the temperature and humidity of the air within the container 102 are typically provided as part of the container 102. Those skilled in the art will appreciate, however, that although the invention is described herein by reference to systems for controlling the temperature and humidity of air within the container 102, the invention is equally applicable to systems that are used to control the temperature and humidity of other gases that may be confined within the container 102.

Figure 1:
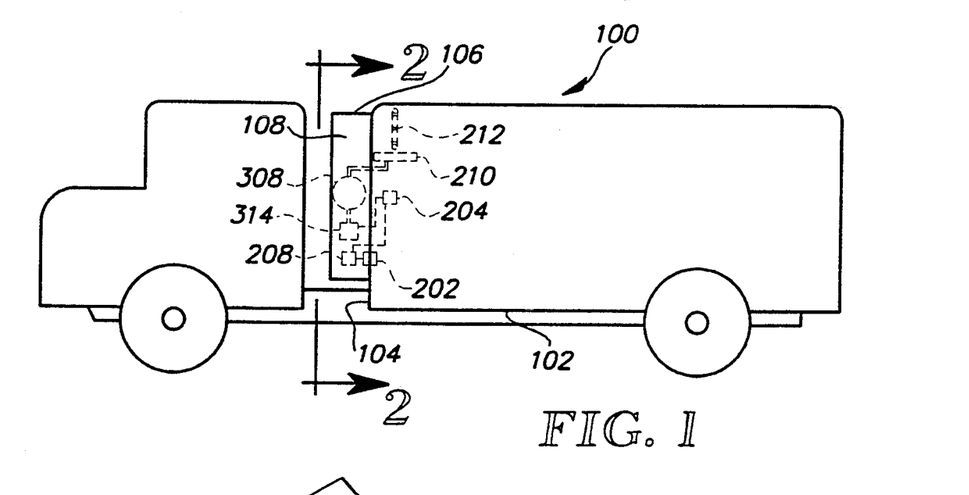
Figure 2:
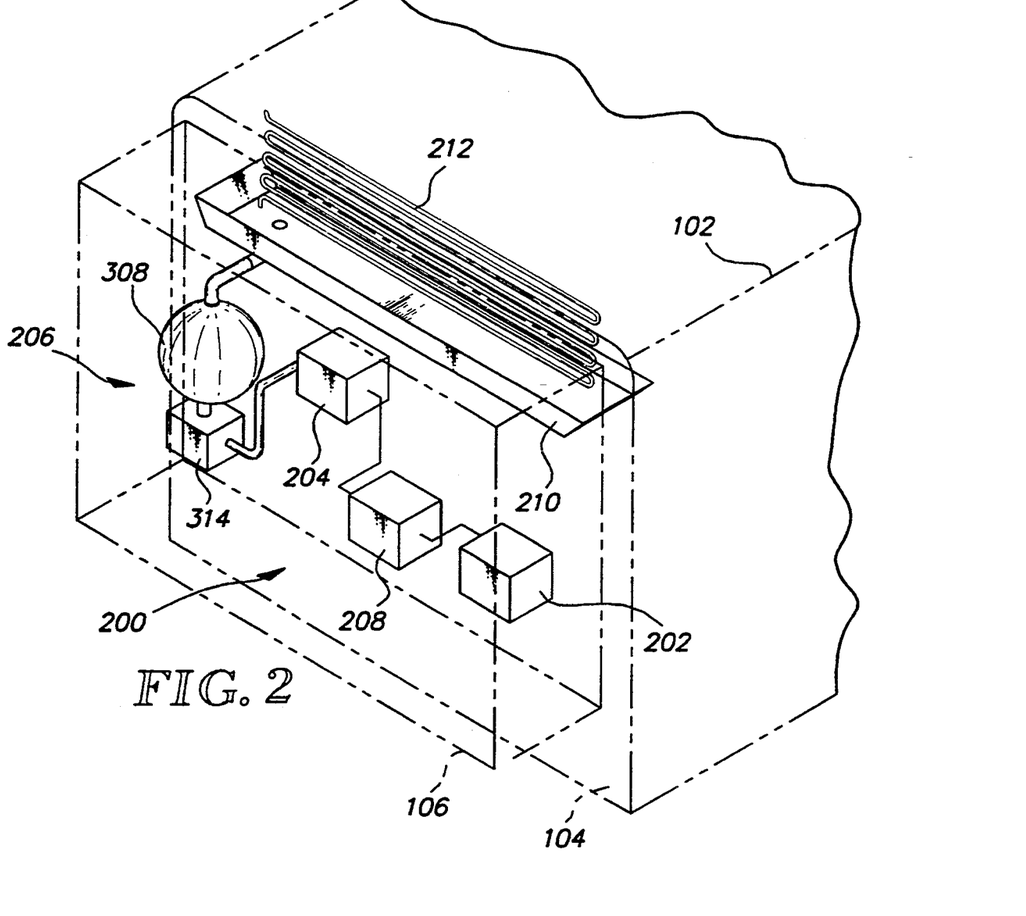

An illustrative schematic diagram taken along lines 2—2 of the container 102 is provided in FIG. 2. Therein, a humidity control system 200 is positioned proximate a sidewall 104 of the container 102. The sidewall 104 cooperates with a hood 106 to define a storage compartment 108. As illustrated in FIG. 1, portions of the humidity control system 200 are positioned interior of the container 102 and portions of the humidity control system 200 are positioned in the storage compartment 108.

The humidity control system 200 also includes a sensor system 202 for sensing the temperature and humidity of the air in the container 102. As illustrated in FIG. 1, and will be described in more detail below by reference to FIG. 3, the sensor system 202 may be constructed for sensing the temperature and humidity of both the air within the container 102 and the air outside the container 102. In the presently preferred embodiment of the invention, the sensor system 202 is constructed for sensing the temperature and humidity of the air inside the container 102 and for sensing the temperature of the air outside the container 102. Further, with respect to the temperature outside the container 102, the sensor system 202 is constructed for sensing the temperature inside the storage compartment 108, however, the sensor system 202 could be constructed for sensing other temperatures outside the container 102 without departing from the invention. The sensor system 202 is constructed to provide sensor signals indicative of the temperature and humidity sensed.

The humidity control system 200 also includes a controlled droplet applicator 204, referred to as a "CDA" in FIG. 2. The controlled droplet applicator 204 is coupled to receive water from a water flow control system 206, the details of which will be described more fully below. The controlled droplet applicator 204 is constructed to convert the water received from the water flow control system 206 into tiny water droplets to be absorbed into the air within the container 102. The controlled droplet applicator 204 is positioned interior of the container 102. Although only one position for the controlled droplet applicator 204 is illustrated in FIGS. 1 and 2, it should be appreciated by those skilled in the art that several controlled droplet applicators could be provided and spaced throughout the container 102 to improve the distribution of water provided to the air in the container.

In a presently preferred embodiment of the invention, the controlled droplet applicator 204 is constructed to convert the water provided from the water flow control system 206 into water droplets having diameters on the order of 50 micrometers. However, those skilled in the art will appreciate that water may be converted into water droplets of any size so long as the water droplets are of a size so that they are capable of being absorbed into the air confined within the container 102. Further, the desired size of the water droplets may vary depending on the environmental conditions prevailing in the container 102, e.g.: whether air is confined within the container 102 or some other gas as discussed above; the temperature of the confined gas; the desired humidity of the confined gas, etc.

In a particularly preferred embodiment of the invention, the controlled droplet applicator 204 is constructed to operate under the action of a centrifugal disk (not shown) that is rotatable about an axis of rotation and has an oblique annular outer skirt (not shown) that generates a spray cone of small droplets. During the rotation of the centrifugal disk, a gas stream is formed in the spray cone and directed from outside the spray cone axially toward the centrifugal disk so as to form a centripetal gas flow extending in a direction transverse to the centrifugal disk's axis of rotation and reducing the diameter of the spray cone. Such a controlled droplet applicator is shown and described in U.S. Pat. No. 4,562,958 issued to George W. Busch on Jan. 7, 1986, the disclosure of which is incorporated herein, in its entirety, by the foregoing reference thereto. Those skilled in the art will appreciate, however, that other systems for providing water droplets to be absorbed into the air may be substituted for the controlled droplet applicator 204 without departing from the present invention.

The controlled droplet applicator 204 is coupled to receive a humidity control signal from a humidity system controller 208, which is positioned in the storage compartment 108. The humidity system controller 208 is coupled to the sensor system 202 and is responsive to the sensor signals received therefrom for controlling the operation of the humidity control system 200. In particular, the humidity system controller 208 is responsive to the sensor signals for providing a water control signal to the water flow control system 206 and for providing a humidity control signal to the controlled droplet applicator 204 to thereby control the amount of water that is provided to the air confined within the container 102.

As discussed briefly above, the water flow control system 206 is constructed for controlling the flow of water to and from the controlled droplet applicator 204. More particularly, the water flow control system 206 is constructed for substantially preventing water from freezing within the controlled droplet applicator 204. This is performed by: (1) selectively heating water within the water flow control system; (2) selectively withdrawing water from the controlled droplet applicator 204; and (3) recycling water provided to the air within the container 102 by the controlled droplet applicator 204.

The water flow control system 206 is coupled to a drain pan 210 for receiving water from the drain pan 210. The drain pan 210 is positioned inside the container 102 proximate a refrigerating coil 212, also positioned inside the container 102 for cooling the quantity of air confined therein, as is known in the art. Those skilled in the art will appreciate that the refrigerating coils 212 have a tendency to condense and freeze water absorbed from the quantity of air confined in the container 102. Further, prior art systems have provided apparatus for periodically heating the refrigerating coils 212 to relieve water condensed thereon. The the drain pain 210 is provided for receiving water periodically released from the refrigerating coils 210 and for recycling the water to the water flow control system 206. The drain pan 210 may comprise any apparatus constructed and positioned for collecting and recycling water released from the refrigerating coils 212.

As illustrated in FIG. 1 and 2, the refrigerating coils 212 are typically positioned at the top of the container 102 proximate the storage compartment 108. Preferably, the controlled droplet applicator 204 is positioned vertically beneath the refrigerating coils 212 to prevent water droplets provided to the air inside the container from being condensed on the refrigerating coils 212 before the water droplets are absorbed into the air. However, other positioning of the controlled droplet applicator 204 may be provided without departing from the invention.

Figure 3:
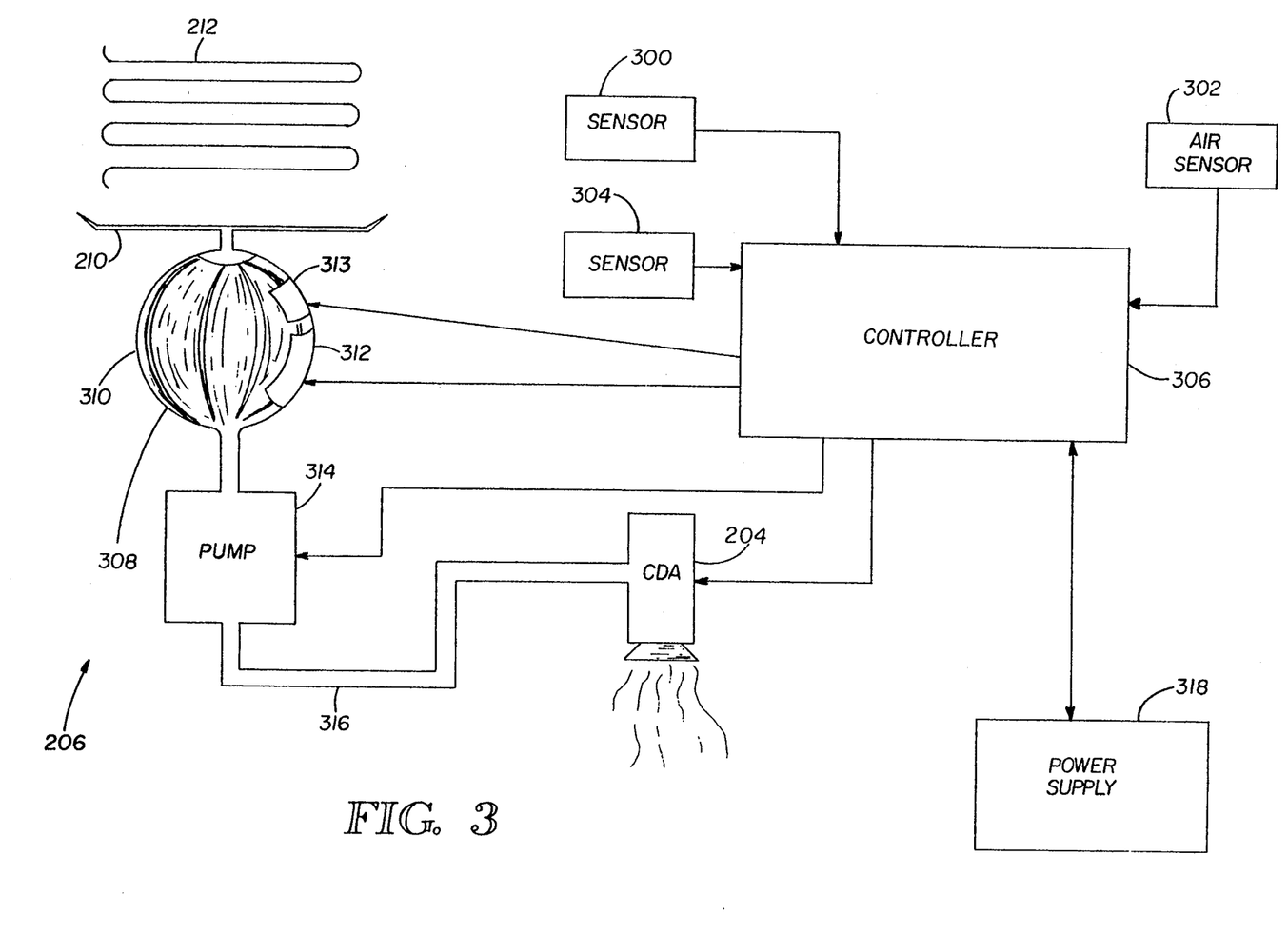

With reference to FIG. 3, a more detailed schematic diagram of the humidity control system is provided. Therein, the sensor system 202 is shown to include three sensors 300, 302, and 304. The sensors 300 and 302 are constructed for sensing the temperature of the air inside of the container 102 and outside of the container 102, respectively. The sensors 300 and 302 are further constructed to provide first and second temperature signals indicative of the sensed temperature of the air. The sensor 304 is constructed to sense the humidity of the air within the container 102 and to provide a humidity signal indicative of the sensed humidity. Each of the sensors 300, 302, and 304 may be readily constructed and/or provided from commercial sensors available to those skilled in the art.

The sensors 300, 302, and 304 provide the first and second temperature signals, and the humidity signal to a controller 306. The controller 306 is coupled to the controlled droplet applicator 204 for providing the humidity control signal thereto. The controller 306 is also coupled to the water flow control system 206 for controlling its operation, as will be discussed below.

The controller 306 is constructed to perform the same function as described hereinabove by reference to the humidity system controller 208. More particularly, the controller 306 is constructed to control the operation of the humidity control system in response to the signals provided from the sensors 300-304. The controller 306 and the humidity system controller 208 may be constructed from any apparatus for performing the above-described functions, e.g., typical data processing circuitry constructed for performing the stated function. More particularly, the humidity system controller 208 and controller 306 may comprise a microprocessor coupled with memory devices and other electronic circuitry for controlling the operation of the humidity control system. Alternatively, the humidity system controller 208 and controller 306 may be made from standard data processing circuitry with or without a programmable logic array as are well-known in the art. Many other constructions for the humidity system controller 208 and the controller 306 will readily become apparent to those skilled in the art. In the presently preferred embodiment of the invention, the controller 306 and humidity system controller 208 are constructed using a microprocessor in combination with memory and other peripheral circuitry.

As discussed above, the water flow control system 206 includes a drain pan 210 positioned beneath refrigerating coils 212 for recycling water condensed on the refrigerating coils 212. The water flow control system 206 also includes a reservoir 308 for containing water used to increase the humidity of the air confined in the container 102. In a presently preferred embodiment of the invention, the reservoir 308 is constructed to contain approximately five gallons of water. Those skilled in the art will appreciate that the reservoir 308 may be constructed to contain more or less water as is necessary. However, those skilled in the art will also appreciate that due to the ability of the water flow control system 206 to recycle water provided to the air within the container 102, the capacity of the reservoir 308 need not be as large as in prior art systems.

In another presently preferred embodiment of the invention, the reservoir 308 includes an expandable portion 310. The expandable portion 310 may be a flexible side portion of the reservoir 308 constructed to enable the contents of the reservoir to expand without damaging the reservoir. Alternatively, the flexible portion may be a pleated or bellowed side portion of the reservoir 308. Other constructions for the expandable portion 310 of the reservoir 308 may be provided by those skilled in the art to enable the volume of water contained in the reservoir to expand upon freezing without damage to the reservoir 308. Further, although the reservoir 308 is illustrated in FIG. 3 as a round container, other constructions for the reservoir 308 may be provided without departing from the invention. In one presently preferred embodiment of the invention, the reservoir 308 is constructed with a rectangular shape having expandable side portions.

The reservoir 308 further includes a heating element 312 and a temperature sensor 313, both of which are thermally coupled to the reservoir 308. The heating element 312 is responsive to a heat control signal received from the controller 306 for heating water contained in the reservoir 308. The controller 306 is responsive to the temperature sensor 313 for periodically providing the heat control signal to the heating element 312 to maintain the temperature of the water contained in the container above freezing. In a presently preferred embodiment of the invention, the controller 306 is also responsive to the sensor 302 for providing the heat control signal when the temperature of the air outside of the container 102 falls below a first predetermined temperature. In another presently preferred embodiment of the invention, the controller 306 is responsive to the sensor 302 for providing the heat control signal to the heating element 312 when the temperature of the air outside of the container 102 is intermediate first and second predetermined temperatures, as will be discussed in more detail below.

The reservoir 308 is constructed to provide water contained therein to a pump 314. The pump 314 is coupled to a conduit 316, intermediate the reservoir 308 in the controlled droplet applicator 204. The pump 314 is responsive to a pump control signal provided by the controller 306 to control the amount and direction of water provided by the controller 306 to control the amount and direction of water provided to and from the reservoir 308, as will be discussed in more detail below. The combination of the pump 314 and the conduit 316 is provided for transmitting water between the reservoir 308 and the controlled droplet applicator 204. More particularly, the pump 314 and conduit 316 are constructed to pump water both to the controlled droplet applicator 204 from the reservoir 308 and to the reservoir 308 from the controlled droplet applicator 204.

In normal operation, the controller 306 is responsive to the temperature sensor 300 and the humidity sensor 304 within the container 102 to provide the pump control signal and the humidity control signal to the pump 314 and the controlled droplet applicator 214, respectively, to change the humidity of the air confined in the container 102 thereby to maintain the humidity of the air at a desired level. As is known in the art, humidity is a function of the dew point, temperature, and pressure of the air confined in the container 102. The controller 306 determines how much the humidity must be changed by knowing the sensed humidity and temperature, and the desired humidity. The controller 306 is also provided with the pressure of the gas within the container 102. In a presently preferred embodiment of the invention, the pressure is considered to be a constant value, i.e., atmospheric pressure, and is therefore not sensed. However, those skilled in the art will appreciate that the sensor system 202 could be readily constructed to sense the pressure of the quantity of gas within the container 102 and to provide a signal indicative of the sensed pressure to the controller 306.

Since the humidity is a function of the dew point, temperature, and pressure of the air in the container 102, and since the humidity differential, temperature, and pressure of the air in the container are known, the controller 306 can cause the desired change in the humidity by changing the dew point of the air confined in the container 102. The controller 306 therefore provides the pump control signal and the humidity control signal so that sufficient water is provided to the controlled droplet applicator 204 and distributed in a manner to cause the desired change in dew point and thereby cause the desired humidity change.

In a particularly preferred embodiment of the invention, the controller 306 is constructed to provide the pump control signal and the humidity control signal in a manner to proportionally decrease the amount of water that is provided to the air in the container. More particularly, after the controller 306 determines the differential between the desired humidity and the present humidity, the controller 306 provides the pump control signal and the humidity control signal in a manner such that the closer the present humidity is to the desired humidity, the less water that is supplied to the air. Those skilled in the control art will recognize that such control is typically referred to as proportional control and may be implemented in a variety of ways. One presently preferred algorithm for implementing proportional control in the present invention is the proportional, integral, derivative algorithm.

As discussed above, the pump 314 is further responsive to the pump control signal to pump water from the controlled droplet applicator 204 to the reservoir 308. In a presently preferred embodiment of the invention, the controller 306 is responsive to the sensor 302 for providing the pump control signal to control the pump 314 to pump water from the controlled droplet applicator 204 to the reservoir 302 when the temperature of the gas outside the container 102 reaches a third predetermined temperature. In another presently preferred embodiment of the invention, the third predetermined temperature is selected to be a temperature intermediate the first and second predetermined temperatures, discussed above by reference to the heating element 312.

Accordingly, in operation the controller 306 is constructed to turn on the heating element 312 when the temperature of the air outside the container 102 is close to the freezing point of water so that the water within the reservoir 308 does not freeze and, therefore, will not cause damage to the pump 314 or the controlled droplet applicator 204. After the temperature of the air outside the container 102 reaches the third predetermined temperature, intermediate the first and second predetermined temperatures, the controller 306 causes the pump 314 to pump water from the controlled droplet applicator 204 and the conduit 316 into the reservoir 308 so that the controlled droplet applicator is purged of water. If the temperature of the air outside the container 102 falls further, below the second predetermined temperature, the heating element 314 is turned off so that water is permitted to freeze within the reservoir 308 of the water flow control system 206. However, since the controlled droplet applicator 204, pump 314, and conduit 316 have already been purged of water, the freezing water will not damage these elements.

In the presently preferred embodiment of the invention, the pump 314 comprises a peristaltic pump controlled for bidirectional pumping of water contained in the conduit 316. A peristaltic pump is preferred since it does not require interruption of the conduit 316 intermediate the controlled droplet applicator 204 and the reservoir 308 and, therefore, is less likely to create leaks. Further, a peristaltic pump is preferred since it can be operated to pump gas as efficiently as liquid and, therefore, will not only effectively purge water from the controlled droplet applicator 204, the pump 314, and the conduit 316 but will also return water to these elements without being primed, as is required for pumps used in prior art humidity control systems. Still further, use of a peristaltic pump permits low flow operation that can be carefully controlled by controlling the pump speed, thereby permitting proportional control of the amount of water supplied to the air in the container 102, as discussed above.

The humidity control system further includes a power supply 318 for supplying power to the system. The controller 306 is constructed to monitor the power received from the power supply 318 to control its operation. Generally, power supplied from the power supply 318 may be obtained from a variety of sources. The power may be provided from a source external to the container 102 or, alternatively, from a local source such as a major generator. The controller 306 monitors the power supplied from the power supply 318 to determine whether the power is being provided from the local source and, if not, turn off all power to the controlled droplet applicator 204, sensors 300–304, heating element 312, and pump 314.

The present embodiments of this invention are to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A humidity control system for regulating the humidity of a confined space wherein the confined space substantially confines a quantity of air and wherein outside air is outside of the confined space, the confined space further including refrigerating coils for cooling the quantity of air in the confined space, said humidity control system comprising:

a first temperature sensor for determining the temperature of the quantity of air in the confined space, said first temperature sensor being constructed to provide a first temperature signal indicative of the temperature of the quantity of air in the confined space;

a second temperature sensor for determining the temperature of the outside air, said second temperature sensor being constructed to provide a second temperature signal indicative of the temperature of the outside air;

a humidity sensor for determining the humidity of the quantity of air in the confined space, said humidity sensor being constructed to provide a humidity sample signal indicative of the humidity of the quantity of air in the confined space;

a reservoir, positioned proximate the outside air, for containing water used to increase the humidity of the quantity of air in the confined space, said reservoir being constructed to contain no more than five gallons of water, said reservoir being further constructed with substantially flexible side portions to permit said reservoir to expand when the water contained therein freezes thereby to prevent damage to said reservoir;

a heater thermally coupled to said reservoir for providing heat to the water contained in said reservoir, said heater being responsive to a heat control signal for providing heat to the water contained in said reservoir;

a third temperature sensor for determining the temperature of the water contained in said reservoir, said third temperature sensor being constructed to provide a third temperature signal indicative of the temperature of the water contained in said reservoir;

a humidity system controller responsive to said humidity sample signal and said first, second, and third temperature signals for controlling the operation of the humidity control system, said humidity system controller being constructed to respond to said second and third temperature signals to provide said heat control signal to control the operation of said heater, said humidity system controller being further constructed to control the operation of said heater so that, when the temperature of the outside air proximate said reservoir is intermediate first and second predetermined temperatures, wherein said first predetermined temperature is greater than said second predetermined temperature, said heater is controlled to provide heat to the water contained in said reservoir, said humidity system controller being responsive to said third temperature signal to modulate said heat control signal to prevent the water contained in said reservoir from freezing;

a peristaltic pump coupled to said reservoir, said peristaltic pump being responsive to a pump control signal for pumping water to and from said reservoir, said humidity system controller being constructed to provide said pump control signal to control the operation of said peristaltic pump, said humidity system controller being constructed to control the operation of said peristaltic pump so that when said second temperature signal indicates that the temperature of the outside air proximate said reservoir is below said second predetermined temperature, water is pumped into said reservoir and when said second temperature signal indicates that the temperature of the outside air proximate said reservoir is above said second predetermined temperature water is pumped out of said reservoir;

a controlled droplet applicator coupled to said peristaltic pump for fluid flow therebetween, said controlled droplet applicator being responsive to a humidity control signal for converting water received from said peristaltic pump into water droplets sized small enough to be absorbed into the quantity of air of the confined space, said humidity system controller being constructed to provide said humidity control signal for controlling the operation of said controlled droplet applicator, said humidity system controller being responsive to said first temperature signal and said humidity system for determining the amount of water to be added to the air confined within the container and for providing said pump control signal and said humidity control signal in a manner to proportionally decrease the amount of water droplets provided to the quantity of air by said controlled droplet applicator thereby to control the humidity of the quantity of air contained in the confined space; and a drain pan positioned below the refrigerating coils for collecting water released therefrom, said drain pan being coupled to said reservoir for providing the collected water to said reservoir.

2. A humidity control system for regulating the humidity of a confined space wherein the confined space substantially contains a quantity of gas said humidity control system comprising:

first sensor means for sensing the temperature and the humidity of the quantity of gas contained in the confined space;

controlled droplet applicator means for increasing the humidity of the quantity of gas contained in the confined space;

water supply means coupled to said controlled droplet applicator means for supplying the water used to increase the humidity of the quantity of gas contained in the confined space, said water supply means being responsive to a water supply control signal to supply water to said controlled droplet applicator means and to withdraw water from said controlled droplet application means;

second sensor means for sensing the temperature of a gas proximate said water supply means; and data processing means responsive to said first sensor means for controlling the operation of said controlled droplet applicator means and said water supply means to maintain the humidity of the gas contained in the confined space within a predetermined range, said data processing means being further responsive to said second sensor means for providing said water supply control signal so that when the temperature of the gas proximate said water supply means is below a first predetermined temperature, said water supply means withdraws water from said controlled droplet applicator means.

3. The humidity control system as recited in claim 2 wherein said water supply means further comprises:
reservoir means for containing the water supplied to and withdrawn from said controlled droplet applicator means; and
heater means responsive to said data processing means for providing heat to the water contained in said reservoir means.

4. The humidity control system as recited in claim 2 wherein said water supply means further comprises:
reservoir means for containing the water supplied to and withdrawn from said controlled droplet applicator means said second sensor means being constructed for sensing the temperature of a gas proximate said reservoir means; and
heater means responsive to said data processing means for providing heat to the water contained in said reservoir means, said data processing means being responsive to said second sensor means to control said heater means to supply heat to the water contained in said reservoir means when the temperature of the gas proximate said reservoir means is below a second predetermined temperature, said second predetermined temperature being greater than said first predetermined temperature.

5. The humidity control system as recited in claim 2 wherein said water supply means further comprises:
reservoir means for containing the water supplied to and withdrawn from said controlled droplet applicator means;
third sensor means for providing a signal to said data processing means indicative of the temperature of the water contained in said reservoir means; and
heater means responsive to said data processing means for providing heat to the water contained in said reservoir means, said data processing means being responsive to said third sensor means to control said heater means to supply heat to the water contained in said reservoir means to prevent the water contained in said reservoir means from freezing.

6. The humidity control system as recited in claim 3 wherein said reservoir is constructed with substantially flexible side portions.

7. The humidity control system as recited in claim 2 wherein said water supply means further comprises peristaltic pump means coupled to said reservoir means for pumping water and the quantity of gas contained in the confined space from said reservoir means to said controlled droplet applicator means and for pumping water from said controlled droplet applicator means to said reservoir means.

8. The humidity control system as recited in claim 2 wherein the confined space further includes refrigerating coils for refrigerating the quantity of gas contained in the confined space, wherein water condenses on the refrigerating coils and is periodically released therefrom, said humidity control system further comprising:
water collection means for collecting water released from the refrigerating coils, said water collection means being coupled to said water supply means for supplying the collected water thereto to recycle the condensed water.

9. A humidity control system for regulating the humidity of a confined space wherein the confined space substantially contains a quantity of gas, said humidity control system comprising:
first sensor means for sensing the temperature and the humidity of the quantity of gas contained in the confined space;
controlled droplet applicator means for increasing the humidity of the quantity of gas contained in the confined space;
reservoir means for containing water supplied to said controlled droplet applicator means, said reservoir means including heater means responsive to a heat control signal for providing heat to the water contained in said reservoir means;
second sensor means for sensing the temperature of a gas proximate said reservoir means;
data processing means responsive to said first sensor means for controlling the operation of said controlled droplet applicator means and said water supply means to maintain the humidity of the gas contained in the confined space within a predetermined range, said data processing means being further responsive said second sensor means to control said heater means to supply heat to the water contained in said reservoir means when the temperature of the gas proximate said reservoir means is below a first predetermined temperature; and
pump means responsive to a pump control signal for pumping water to and from said reservoir means, said data processing means being further constructed to provide said pump control signal for controlling the operation of said pump means, said data processing means being further responsive to said second sensor means for providing said pump control signal so that water is pumped from said controlled droplet applicator means to said reservoir means when the temperature of the gas proximate said reservoir means is below a second predetermined temperature.

10. The humidity control system as recited in claim 9 wherein aid pump means further comprises peristaltic pump means coupled to said reservoir means for pumping water said reservoir means to said controlled droplet applicator means and for pumping water from said controlled droplet applicator means to said reservoir means.

11. The humidity control system as recited in claim 9 wherein said reservoir means is constructed with substantially flexible side portions.

12. The humidity control system as recited in claim 9 wherein the confined space further includes refrigerating coils for refrigerating the quantity of gas contained in the confined space, wherein water condenses on the refrigerating coils and is periodically released therefrom, said humidity control system further comprising:
water collection means for collecting water released from the refrigerating coils, said water collection means being coupled to said reservoir means for supplying the collected water thereto to recycle the condensed water.

13. A humidity control system for regulating the humidity of a confined space wherein the confined space substantially contains a quantity of gas, the confined space further including refrigerating coils for refrigerating the quantity of gas contained in the confined space wherein water condenses on the refrigerating coils and is periodically released therefrom, said humidity control system further comprising:

first sensor means for sensing the temperature and the humidity of the quantity of gas contained in the confined space;

controlled droplet applicator means for increasing the humidity of the quantity of gas contained in the confined space;

reservoir means for containing water supplied to said controlled droplet applicator means, said reservoir means including water collection means for collecting water released from the refrigerating coils, said water collection means being coupled to said water supply means for supplying the collected water thereto to recycle the collected water;

second sensor means for sensing the temperature of a gas proximate said reservoir means;

data processing means responsive to said first sensor means for controlling the operating of said controlled droplet applicator means and said water supply means to maintain the humidity of the gas contained in the confined space within a predetermined range, said data processing means being further responsive to said second sensor means to control said heater means to supply heat to the water contained in said reservoir means when the temperature of the gas proximate said reservoir means is intermediate first and second predetermined temperatures, said first predetermined temperature being greater said second predetermined temperature; and pump means responsive to a pump control signal for pumping water to and from said reservoir means, said data processing means being further constructed to provide said pump control signal for controlling the operation of said pump means, said data processing means being responsive to said second sensor means for providing said pump control signal so that water is pumped from said controlled droplet applicator means to said reservoir means when the temperature of the gas proximate said reservoir means is below a second predetermined temperature.

14. The humidity control system as recited in claim 13 wherein said pump means further comprises peristaltic pump means coupled to said reservoir means for pumping water from said reservoir means to said controlled droplet applicator means and for pumping water from said controlled droplet applicator means to said reservoir means.

15. The humidity control system as recited in claim 13 wherein said reservoir means is constructed with substantially flexible side portions.

16. A humidity control system for regulating the humidity of a confined space wherein the confined space substantially contains a quantity of gas, said humidity control system further comprising:

first sensor means for sensing the temperature and the humidity of the quantity of gas contained in the confined space;

controlled droplet applicator means, responsive to a humidity control signal, for increasing the humidity of the quantity of gas contained in the confined space;

water supply means, responsive to a water supply signal, for supplying water to said control droplet applicator means, said water supply means including heater means for heating a portion of the water contained in said water supply means;

second sensor means for sensing the temperature of a gas proximate said water supply means;

data processing means for controlling the operation of said control droplet applicator means to maintain the humidity of the gas contained in the confined space above a predetermined value, said data means being responsive to said first sensor means for determining the amount of water that must be added to the gas contained in the container to increase the humidity above the predetermined value and for providing the humidity control signal to proportionally regulate the amount of water added to the gas contained in the container, said data processing means being further constructed to modulate said water supply signal in combination with said humidity control signal to proportionally regulate the amount of water added to the gas contained in the container, said heater means being responsive to said data processing means for heating a portion of water contained in said water supply means, said data processing means being responsive to said second sensor means to control said heater means to supply heat to the water contained in said water supply means when the temperature of the gas proximate said water supply means is below a first predetermined temperature; and pump means responsive to a pump control signal for pumping water to and from said water supply means, said data processing means being further constructed to provide said pump control signal for controlling the operation of said pump means, said data processing means being responsive to said second sensor means for providing said pump control signal so that water is pumped from said controlled droplet applicator means to said water supply means means when the temperature of the gas proximate said water supply means is below a second predetermined temperature.

17. The humidity control system as recited in claim 16 wherein said pump means further comprises peristaltic pump means coupled to said reservoir means for pumping water from said reservoir means to said controlled droplet applicator means and for pumping water from said controlled droplet applicator means to said reservoir means.

18. A method for humidifying a confined space wherein the confined space contains a quantity of a gas and wherein the humidity of the gas is to be maintained at a predetermined value, the confined space including a reservoir for storing water, the reservoir being surrounded by outside air, the confined space also including refrigerating coils for cooling the quantity of the gas, said method comprising the steps of:

sensing the temperature and the humidity of the quantity of the gas in the confined space;

determining the difference between the sensed humidity and the predetermined value of humidity;

providing water droplets to the gas to proportionally decrease the difference between the sensed humidity and the predetermined value of humidity;

sensing the temperature of the outside air surrounding the reservoir and the temperature of the water stored in the reservoir;

heating the reservoir when the temperature of the outside air is within a predetermined range and the temperature of the water stored in the reservoir is below a predetermined value; and collecting water that condenses upon the refrigerating coils and supplying the collected water to the reservoir to be stored until such time that the water is supplied to the quantity of gas contained in the confined space.

19. A method for humidifying a confined space wherein the confined space contains a quantity of a gas, the confined space including a reservoir for storing water, the reservoir being surrounded by outside air, said method comprising the steps of:

sensing the temperature and the humidity of the quantity of the gas in the confined space and providing water droplets to the quantity of the gas within the confined space to maintain the humidity within a predetermined range; and sensing the temperature of the outside air surrounding the reservoir and sensing the temperature of the water stored in the reservoir and heating the reservoir when the temperature of the outside air is within a predetermined range and the temperature of the water stored in the reservoir is below a predetermined value.

20. The method as recited in claim 19 wherein the confined space further includes refrigerating coils for cooling the quantity of the gas, said method further comprising the step of collecting water that condenses upon the refrigerating coils and supplying the collected water to the reservoir to be stored until such time that the water is supplied to the quantity of gas contained in the confined space.

21. The method as recited in claim 19 wherein the humidity of the gas is to be maintained at a predetermined value, said method further comprising the steps of:

determining the difference between the sensed humidity and the predetermined value of humidity; and providing water to the gas to proportionally decrease the difference between the sensed humidity and the predetermined value of humidity.

22. The method as recited in claim 21 wherein the confined space further includes refrigerating coils for cooling the quantity of the gas, said method further comprising the step of collecting water that condenses upon the refrigerating coils and supplying the collected water to the reservoir to be stored until such time that the water is supplied to the quantity of gas contained in the confined space.

23. A humidity control system for regulating the humidity of a confined space wherein the confined space substantially contains a quantity of gas and is surrounded by outside gas, said humidity control system comprising:

humidity sensor means for sensing the humidity of the quantity of gas contained in the confined space;

controlled droplet applicator means for providing water to the confined space, said controlled droplet applicator means being constructed to receive a supply of water having a variable flow rate and being responsive to variation in the flow rate of the supply of water for varying the amount of water supplied to the confined space;

pump means for providing the supply of water to said controlled droplet applicator means, said pump means being responsive to a pump control signal for varying the flow rate of the supply of water being provided to said controlled droplet applicator means; and data processing means for controlling the operation of said controlled droplet applicator means to maintain the humidity of the gas contained in the confined space above a predetermined value, said data processing means being responsive to said humidity sensor means for determining the amount of water that must be added to the gas contained in the container to increase the humidity above the predetermined value and for providing the pump control signal to vary the flow rate of the supply of water being provided to said controlled droplet applicator means so that the amount of water added to the gas contained in the container is proportionally controlled.

24. The humidity control system as recited in claim 23 further comprising inside temperature sensor means for sensing the temperature of the quantity of gas contained in the confined space, said data processing means being further responsive to said inside temperature sensor means for determining the amount of water that must be added to the gas contained in the container to increase the humidity above the predetermined value and for providing the pump control signal to vary the flow rate of the supply of water being provided to said controlled droplet applicator means so that the amount of water added to the gas contained in the container is proportionally controlled.

25. The humidity control system as recited in claim 23 wherein said controlled droplet applicator means is constructed to provide water droplets to the quantity of gas in the confined space and is responsive to a humidity control signal for varying the size of the water droplets supplied to the quantity of gas in the confined space, said data processing means being further constructed for providing the humidity control signal to vary the size of water droplets being added to the quantity of gas so that the amount of water added to the gas contained in the container is proportionally controlled.

26. The humidity control system as recited in claim 23 further comprising reservoir means for containing water supplied to said controlled droplet applicator means, said pump means being coupled to said reservoir means for pumping water from said reservoir means to said controlled droplet applicator means.

27. The humidity control system as recited in claim 26 further comprising heater means responsive to said data processing means for heating a portion of the water contained in said reservoir means.

28. The humidity control system as recited in claim 27 further comprising outside temperature sensor means for sensing the temperature of the outside gas surrounding the confined space, said data processing means being responsive to said outside temperature sensor means to control said heater means to supply heat to the water contained in said reservoir means when the temperature of the outside gas surrounding the confined space is below a first predetermined temperature.

29. The humidity control system as recited in claim 27 further comprising reservoir temperature sensor means for sensing the temperature of the water contained in said reservoir means, said data processing means being responsive to said third sensor means to control said heater means to supply heat sufficient to prevent the water contained in said reservoir means from freezing.

30. The humidity control system as recited in claim 26 wherein said pump means in further responsive to said pump control signal to pump water from said controlled applicator means to said reservoir means, said humidity control system further including outside temperature sensor means for sensing the temperature of the outside gas surrounding the confined space, said data processing means being responsive to said outside temperature sensor means for providing said pump control signal so that water is pumped from said controlled droplet applicator means to said reservoir means when the temperature of the outside gas surrounding the confined space is below a predetermined temperature.

31. The humidity control system as recited in claim 23 wherein said pump means further comprises a peristaltic pump.

32. A humidity control system for regulating the humidity of a confined space wherein the confined space substantially contains a quantity of gas and is surrounded by outside gas, said humidity control system comprising:

sensor means for sensing the temperature and humidity of the quantity of gas contained in the confined space;

controlled droplet applicator means for providing water to the confined space, said controlled droplet applicator means being constructed to receive a supply of water having a variable flow rate and being responsive to variation in the flow rate of the supply of water for varying the amount of water supplied to the confined space;

pump means for providing the supply of water to said controlled droplet applicator means, said pump means being responsive to a pump control signal for varying the flow rate of the supply of water being provided to said controlled droplet applicator means; and data processing means for controlling the operation of said controlled droplet applicator means to maintain the humidity of the gas contained in the confined space above a predetermined value, said data processing means being responsive to said sensor means for determining the amount of water that must be added to the gas contained in the container to increase the humidity above the predetermined value and for providing the pump control signal to vary the flow rate of the supply of water being provided to said controlled droplet applicator means so that the amount of water added to the gas contained in the container is proportionally controlled.

33. A method for proportionally controlling the humidity of a quantity of gas contained in a confined space, said method comprising the steps of:

providing a controlled droplet applicator for providing water to the gas contained in the confined space wherein the controlled droplet applicator is constructed to receive a supply of water having a variable flow rate and responsive to the flow rate of the supply of water for varying the amount of water provided to the gas contained in the confined space;

determining the amount of water that must be added to the gas contained in the confined space to increase the humidity of the gas to a predetermined value; and varying the flow rate of the supply of water to the controlled droplet applicator to proportionally vary the amount of water added to the gas contained in the confined space thereby to increase the humidity of the gas to the predetermined value.

* * * * *